United States Patent

Pugh, Jr. et al.

[15] 3,660,219
[45] May 2, 1972

[54] HETEROGENEOUS CONSTRUCTION OF TEXTILE SHUTTLE SIDE WALLS

[72] Inventors: Carl Starner Pugh, Jr.; Robert Clay Curry, both of Cincinnati, Ohio

[73] Assignee: North American Rockwell Corporation, Pittsburgh, Pa.

[22] Filed: Jan. 11, 1971

[21] Appl. No.: 105,389

[52] U.S. Cl. ............................... 161/93, 139/196, 264/258
[51] Int. Cl. .................. B32b 17/04, B32b 21/08, D03i 5/02
[58] Field of Search .................. 161/93, 94, 98, 88, 156, 200, 161/261; 264/135, 137, 258; 139/196

[56] References Cited

UNITED STATES PATENTS 3,581,698  6/1971  Bete..........................................161/93

*Primary Examiner*—William A. Powell
*Assistant Examiner*—James J. Bell
*Attorney*—John R. Branaugh, Floyd S. Levison, E. Dennis O'Connor and Richard A. Speer

[57] ABSTRACT

Sidewalls for loom shuttles are made of outer or wearing surfaces of unidirectional textile fabric reinforced with phenolic resin and laminated, providing a high abrasion resistant surface with a smooth finish. The next layers on each side are of glass fiber cloth coated with phenolic resin, and finally, between the glass cloth layers, a layer of bulking or filler material. This bulking or filling material layer may be another laminate of textile fabric and phenolic resin or it may be low density material, such as wood. If the bulking layer is of phenolic laminate or wood, an increased amount of rigidity results, though this is not the primary factor for rigidity, which is the result of the outer two layers on each side and particularly the glass cloth laminate layers. The sidewall construction can be fabricated either by pressing all components together as a laminate at one time or forming the individual components separately and later bonding them to form the desired structure in a separate operation.

6 Claims, 2 Drawing Figures

PATENTED MAY 2 1972

3,660,219

INVENTORS.
CARL STARNER PUGH, JR.
ROBERT CLAY CURRY

BY James T. Dunn

ATTORNEY

HETEROGENEOUS CONSTRUCTION OF TEXTILE SHUTTLE SIDE WALLS

BACKGROUND OF THE INVENTION

Originally, shuttles for looms were made of wood, and this was the standard material for more than a century. In later years shuttles have been made of laminates, such as those prepared from phenolic resin impregnated textile fabrics. When properly made, the laminated shuttle sidewalls showed improved abrasion resistance and retained smooth surfaces, assuring a longer life than with wood shuttles, the surfaces of which deteriorated and roughened after a moderate life. The plastic laminate shuttle sidewall construction represented an improvement over all wood shuttles but still left something to be desired, when high speed operation is necessary. In recent years loom manufacturers have sought to operate at higher speeds in order to effect economies in weaving by the textile producer. Typical loom speeds are now about 180 picks/minute. Initial speed increases up to about 230 picks/minute are desired immediately, while still higher speeds will be sought in the future. It is well known that the kinetic energy of a body is given by ½ m v² where $m$=mass, $v$=velocity. This amount of energy must be imparted to the shuttle and removed from it on each flight. Thus the velocity increases (due to higher speed of operation) it is most desirable to compensate by reducing the mass (i.e. the weight). At the same time the stiffness of the sidewalls cannot be reduced or undesirable deflections will result which will interfere with the operation of the bobbin within the shuttle. In fact, with higher speeds it is actually desirable to increase the stiffness of the sidewall (i.e. the section modulus of the sidewall). Thus, the need for a stiffer and lighter sidewall member becomes obvious as operational speeds are increased.

SUMMARY OF THE INVENTION

The present invention is an improvement in sidewall construction of plastic laminated shuttles.

The outside surfaces of the sidewall are phenolic impregnated textile fabrics, such as unidirectional cotton fabric, just as was used before for homogeneous shuttle sidewalls, (for example, see U.S. Pat. Nos. 3,215,762 and 3,263,708), and they exhibit the same desirable surface abrasion resistance and smoothness which made plastic shuttle construction an improvement over the original classical wooden shuttles. Between the outside surfaces of the sidewall there are layers of resin impregnated glass fiber cloth. These layers impart increased rigidity which only a very slight increase in overall weight.

The bulking or filling material, which is placed between the two layers of glass cloth, serves to hold these layers in the desired position and also transmits shear stresses which arise during flexing without physical damage to the assembly. Since the glass cloth layers resist the principal stresses the bulking material itself may be of low density, and relatively weak compared to the glass layers. By choice of a suitable low density filler, such as wood, the weight of the assembly may be reduced substantially without reducing the stiffness.

It is not necessary, however, that the filler material be either weak or of low density. For instance it may also be made of impregnated fabric layers, having a specific gravity of about 1.35, which is about twice that of many woods. In this case the sidewall will be heavier, and also slightly stiffer because of the added stiffness of the filler. Since the filler section lies close to the neutral axis of the sidewall, its modulus contributes relatively less to the sidewall stiffness. The glass layers, being distant from the neutral axis dominate the stiffness characteristic of the sidewall. It is thus possible to use the principal of this invention to increase stiffness without reducing the overall weight. In any case, the relative stiffness (i.e. the stiffness-to-weight ratio) will be increased.

Reference has been made above to a heterogeneous side wall construction with five layers. This does not mean that each layer is of a single ply. On the contrary, it is preferable to make each layer of a number of laminations, of resin impregnated fabric in the case of the two outer surface layers and the glass fiber textile layers next to them. In a similar manner, if the bulking material is of a textile nature, it may be present as a number of laminations. Where the preferred light wood bulking layer is used, ordinarily this will not be a laminated wood layer, although such construction is not excluded.

While the principal features of the present invention lie in the final product, that is to say, the composite or heterogeneous sidewall, and not in the process of making it, it is an advantage of the present invention that standard methods of making laminated products may be used. Thus, for example, all of the components may be hot pressed together at one time to form a laminate, under the standard conditions of temperature and pressure used for laminating, or the individual layers may be formed separately and then bonded together to the final composite product in a separate operation. In general the present invention does not depart from standard good practice in making laminated structures, and it is an advantage that known techniques may be used.

Outside contours of laminated shuttles are usually somewhat curved, and often it is desirable to make up blanks with the end cores and to cut a number of shuttle bodies from them. This, of course, can be done in making shuttles embodying the composite laminated structure in their sidewalls. It is, of course, possible to make individual sidewalls in the finished shape and fastening them to cores in a separate operation. The composite laminated sidewall structure which constitutes the present invention can be formed into the final shuttle by any means, such as those which have been used in laminated shuttles in the past. While the present invention depends for its novelty on the composite sidewall construction, such composite structures are not claimed for all uses and the invention is, therefore, limited to a sidewall for a loom shuttle, as it is with an improvement in this type of structure, or blanks for making it, that the present invention deals.

The present invention produces shuttle sidewalls of improved rigidity and, in some of the preferred modifications, lower weight. Typically, rigidity can be increased by at least 20 percent, for example 21 percent, and density can be reduced by as much as 30 percent. In terms of rigidity, an increase in the modulus of elasticity of the side wall from $1.6 \times 10^6$ psi to $1.94 \times 10^6$ psi results, and the specific gravity may be decreased, for example, from 1.36 to about 1.05. The present invention does not depend for its novelty on a particular exact increase in rigidity or decrease in density, and the above figures are given merely as typical examples of improved properties which can be imparted to shuttle sidewalls by the present invention.

The outer wearing surfaces of the two outer layers are made very smooth by smooth molding the surfaces in a press or by machining, sanding and buffing, or other well known means. The outer surface of these two layers therefore does not differ significantly from the excellent smooth surfaces which have characterized plastic laminated shuttles in the past. This advantageous property is fully retained in the sidewalls of the present invention, which, therefore, is not a compromise with desirable surface properties.

DESCRIPTION OF THE PREFERRED EMBODIMENTS

Figure 1:
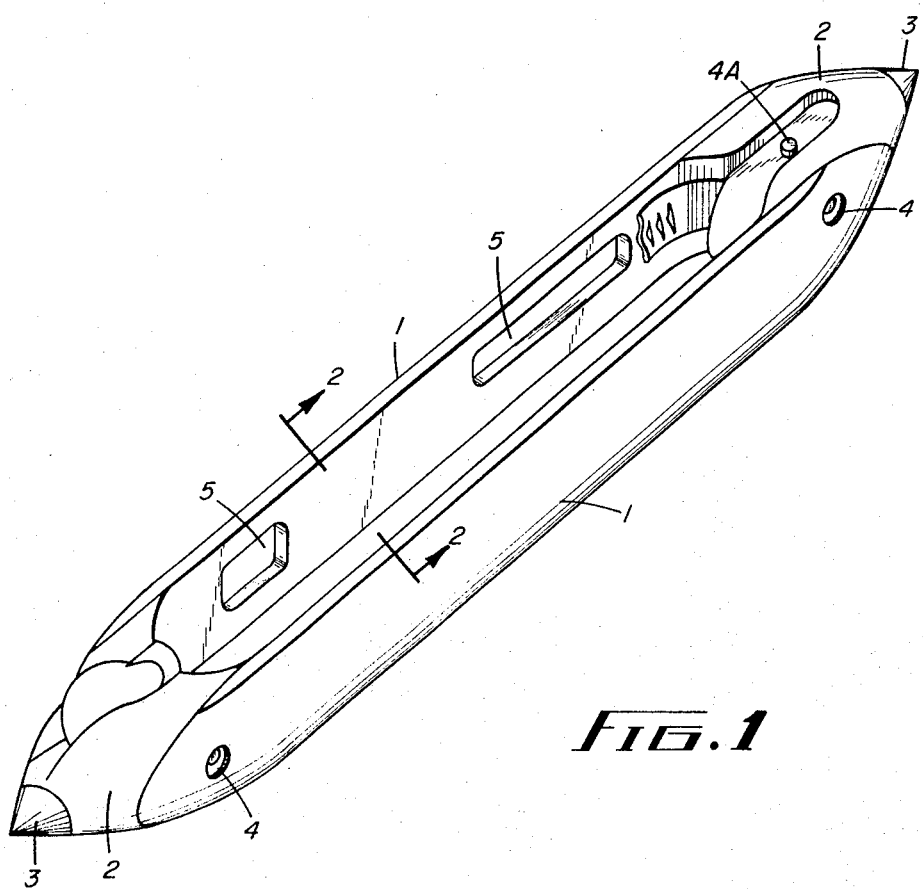
FIG. 1 is an isometric view of a shuttle.

FIG. 1 is an isometric of a shuttle with the side walls according to the present invention. The shuttle has sidewalls 1 which are adhesively bonded to the core 2 either by pressing all of the components together as a laminate or later bonding them, as separate components, into a single structure. Conventional metal tips 3 are inserted at each end to distribute impact stresses and prolong life. Bolts 4 secure necessary hardware 4

A, used to guide the out feeding yarn, and also tend to hold the sidewalls to the core. The sidewalls are provided with openings 5 which reduce weight and permit measurement of the yarn remaining on the bobbin. The bobbin on which the thread is wound is not shown in FIG. 1 as it is not in any way changed by the present invention. In fact, as far as the whole of FIG. 1 is concerned it does not bring out the novel features of the present invention, but shows the overall organization of the shuttle.

Figure 2:
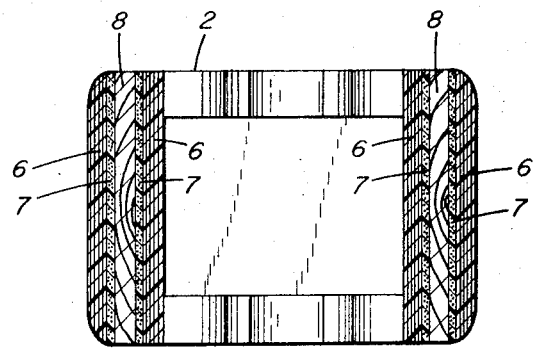
FIG. 2 is a section along the line 2—2 of FIG. 1.

FIG. 2 illustrates the details of the present invention and is a section through the two sidewalls. It will be seen from FIG. 2 that each sidewall is made up of five layers: outer wearing surface layers of fabric impregnated with phenolic resin 6, adjacent layers 7 of glass fiber fabric impregnated with resin; and a center filler or bulking layer 8 which in FIG. 2 is shown as the preferred material, wood.

In order that the invention be more clearly understood the following examples are set forth:

EXAMPLE I

A laminated structure was assembled according to the scheme of FIG. 2 in which the following are assembled.

1. The outside layer 6 consisted of six laminations of unidirectional cotton fabric weighing 9.6 oz/sq. yd. and thread count 63/in. warp × 10/in. fill (such as style 7146 manufactured by Mt. Vernon Mills, Baltimore, Md.) and which was impregnated with a commercially available ammonia catalyzed phenol-formaldehyde resin to obtain a resin content of 50 percent and a flow (or greeness) of 10 percent.
2. A subsequent layer 7 consisting of one lamination of a unidirectional glass fabric, weighing 9.4 oz./sq. yd. and having a warp of 49 yarns/in. (150's 2/2) and a fill of 30 yarns/in. 450's (1/0) (such as Style 1543-I-416 from Burlington Industries, New York, NY) which was coated with the same phenolic resin to obtain 23 percent resin content and an extractables of 75 percent.
3. A central layer 8 consisting of rotary cut, edge glued maple veneer, 0.180 inch thick, having a moisture content of 3.5 percent
4. Another layer 7 identical to item 2.
5. An inner layer 6 similar to item 1, but consisting of only four laminations.

The above assembly was placed in a flat-bed, hydraulic press between stainless steel cauls, whereupon 800 psi pressure was applied, the mass heated to 155°–160° C. (by steam) for 1 hr., whereupon it was cooled and removed. The entire assembly was then baked for 24 hrs. at 150° C. in an oven to complete the cure of layers 6.

Upon removal the surfaces were smooth and polished, due to the cauls, the thickness was 0.400 inch. Both surfaces were then sanded to remove an equal amount of material from each side, until a finished thickness of 0.375 inch was obtained. When 0.030 inch additional material was removed (as would be done in machining the shuttle wall to its final dimension), the modulus of elasticity in bending was found to be $1.94 \times 10^6$ psi and the specific gravity to be 1.05. For comparison, if the impregnated cotton (of layer 6) had been used throughout the modulus of elasticity would have been $1.60 \times 10^6$ psi and the specific gravity 1.36.

EXAMPLE II

Example I was repeated except that layer 8 in the drawing now consisted of nine laminations of the same impregnated cotton fabric as layers 6. After sanding both faces and removing 0.030 inch additional on both sides to approximate machining to final shuttle dimensions, the modulus of elasticity was $1.80 \times 10^6$ psi and the specific gravity was 1.39. In this case the stiffness increase is due, in part, to the central layer as well as to the glass layers. The specific gravity is slightly higher than for the all cotton-phenolic sidewall (i.e. 1.36). It is to be noted, however, that the relative stiffness (obtained by dividing the modulus of elasticity by the specific gravity) is higher for the assembly including the glass layers ($1.29 \times 10^6$) than for the laminate without glass layers ($1.17 \times 10^6$) mentioned in Example I. Thus a net increase in stiffness per unit weight is achieved.

EXAMPLE III

1. A laminate consisting only of phenolic impregnated unidirectional cotton fabric was laid up and pressed on the same cure cycle (including post-bake) as in Example I. Part of this was sanded on one side to a thickness of 0.110 inch to provide the outer layer 6 and on both sides to a thickness of 0.070 inch to provide the inner layer 6.
2. In a similar fashion a laminate was pressed from only the phenolic impregnated unidirectional glass fabric, (which was not post-baked) and which after sanding both sides was 0.0075 inch thick.
3. Five layers were assembled as in FIG. 2 from the materials described in items 1 and 2 above along with a piece of maple veneer 0.171 inch thick as the central layer. All interfaces were coated with an epoxy adhesive which sets at room temperature under contact pressure (such as type RP-4012, supplied by REN Plastics of Lansing, Michigan).
4. The assembly was held under pressure of 2 psi for 16 hrs. then removed from the press, firmly bonded into a single, unitary structure.

EXAMPLE IV

An assembly was made similar to that of Example I except that:

1. The outer layer 6 consisted of five laminations of the same phenolic impregnated cotton fabric.
2. The next layer 7 consisted of four laminations of the same phenolic coated glass fabric.
3. The central layer 8 consisted of 0.150 inch thick maple.
4. The next layer 7 was the same as item 2, above.
5. The inner layer 6 consisted of four laminations of the same fabric as in item 1, above.

After pressing the thickness was 0.382 inch which upon sanding material uniformly from each side to allow for simulation of machining resulted in a thickness of 0.312 inch.

The assembly then had a modulus of elasticity of $2.55 \times 10^6$ and a specific gravity of 1.19. Again the relative stiffness is improved ($2.15 \times 10^6$) over the conventional material consisting of only the impregnated cotton fabric.

It will be understood that the foregoing examples are illustrative only and do not limit the invention. For instance, other thermoset resins such as epoxies, melamine-formaldehyde, urea-formaldehyde, resorcinol-formaldehyde and the like may be used. Any hardwood such as birch, maple, ash, hickory, etc. may be used. Soft woods such as pine or hemlock may be used or even balsa wood. If these latter types are used it may not be possible to bond the structure in a single molding operation because the wood will be unduly compressed. In this case the adhesive bonding of the separate components is to be preferred. It would also be possible to prepare impregnated fabrics which could be laminated at pressures below the compression point of the wood (say 250 psi). Various low density bulking components may be used in place of wood such as foamed plastics (having specific gravity of about 0.40 to 0.90) or wood fiber boards known as hardboard, or plywood or reconstituted wood boards known as particle-board or chipboard.

It will also be understood that the particular dimensions of the assembly may be varied to give any desired result. That is the total thickness of the sidewall, and the thickness of each of the five layers comprising it may be varied. In general the outer layers of resin impregnated fabric are kept as thin as possible, while allowing sufficient material to complete machining and to provide adequate wear. The glass fabric layers are kept thin in order to reduce weight and also are placed as far from the neutral axis as possible, in order to maximize stiffness. Usually the simplest component to vary is the bulking material, while keeping other components constant.

By judicious choice of components one may prepare sidewalls which have (1) the least possible weight (2) the highest stiffness-to-weight ratio (3) the lowest cost for a given stiffness or (4) some optimum combination of these and related properties.

The more rigid shuttle sidewalls, and particularly the preferred modification in which the bulking layer is of wood, permit operation at increased speeds and hence larger woven fabric output; and in the preferred modification where specific gravity of the sidewall is decreased, power inputs and initial load are substantially decreased, with corresponding lowered weaving costs.

We claim:

1. A composite laminated shuttle sidewall formed of five types of layers: outer and inner wearing layers of cotton fabric impregnated with thermosetting resin which are consolidated under heat and pressure, then two layers of glass fiber cloth also impregnated with thermosetting resin and heat and pressure consolidated, and finally a bulking layer, all five layers being firmly bonded together to form a unitary whole wherein the resins become thermoset and which exhibits increased rigidity.

2. A composite shuttle sidewall according to claim 1 in which the thermosetting resin is a thermosetting phenolic resin.

3. A composite shuttle sidewall according to claim 2 in which the central bulking layer is wood, the sidewall showing increased rigidity and also substantially decreased specific gravity.

4. A composite shuttle sidewall according to claim 1 in which the central bulking layer is wood, the sidewall showing increased rigidity and also substantially decreased specific gravity.

5. A composite shuttle sidewall according to claim 1 in which the central bulking layer is composed of textile laminations impregnated with thermosetting resins of the same nature as the outer layers.

6. A composite shuttle sidewall according to claim 2 in which the central bulking layer is composed of textile laminations impregnated with thermosetting phenolic resin of the same nature as the outer layers.

* * * * *